March 8, 1927.     1,619,956
C. R. RENEHAN
CUT-OFF
Filed March 23, 1926
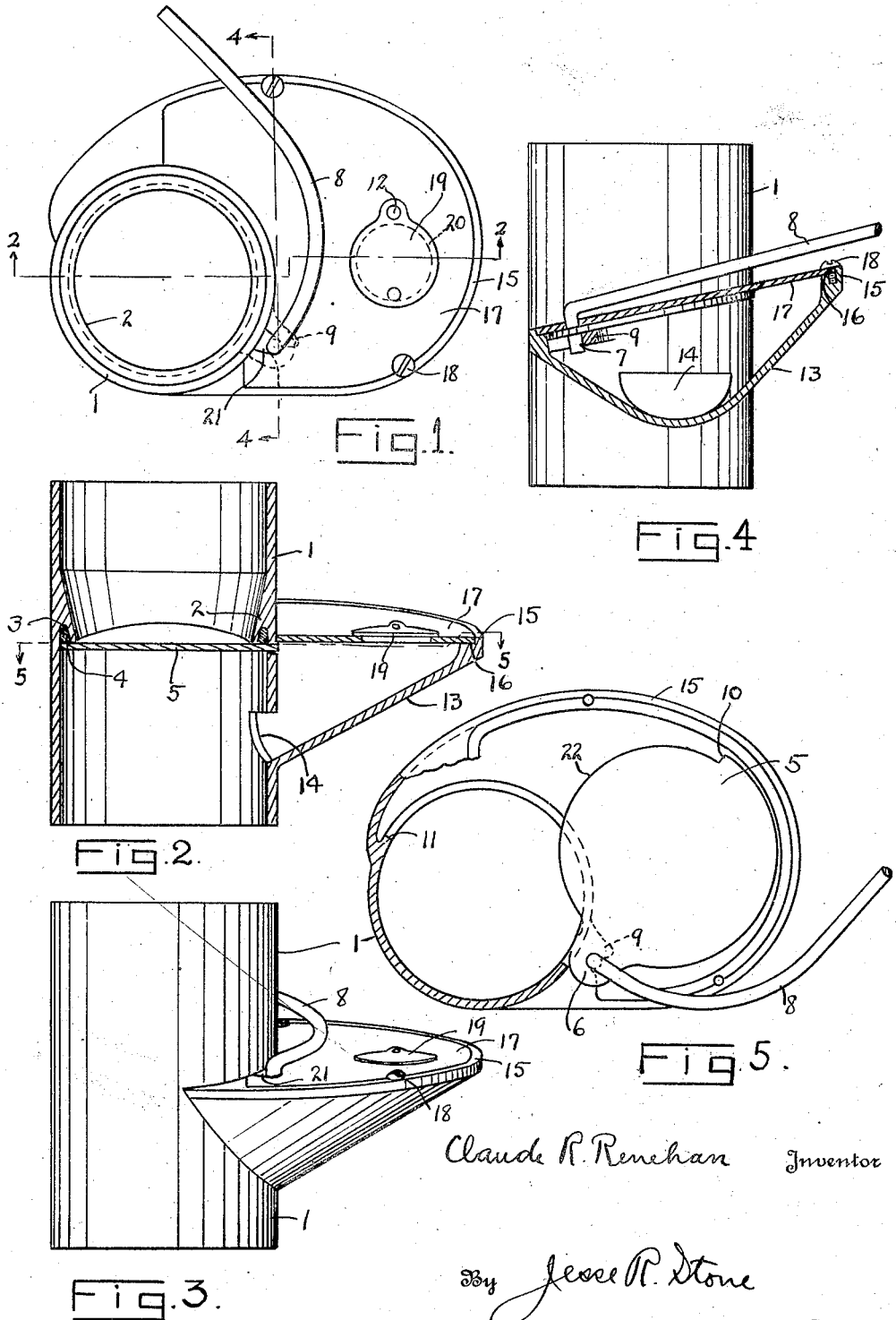
Claude R. Renehan, Inventor
By Jesse R. Stone, Attorney Patented Mar. 8, 1927.

1,619,956

UNITED STATES PATENT OFFICE.

CLAUDE RIVERS RENEHAN, OF TEXAS CITY, TEXAS.

CUT-OFF.

Application filed March 23, 1926. Serial No. 96,900.

My invention relates to a cut-off to be employed in pipes for conducting fluid or any material of a fluid nature, such as grain, sand or the like.

The object of the invention is to provide a cut-off valve adapted to efficiently close the opening through the pipe in which it is used and to be adapted for cleaning itself in such manner that there will be no waste or leakage.

Another object is to provide a housing for the valve when it is in open position, which will allow access thereto when it is desirable to clean or repair the valve.

Other objects lie in the cheapness and economy in the construction of the device and the ease and facility of operation.

Referring to the drawings herewith, wherein a preferred embodiment of the invention is disclosed, Fig. 1 is a top plan view of a short section of pipe upon which my invention has been applied. Fig. 2 is a central vertical section on the line 2—2 of Fig. 1. Fig. 3 is a side elevation of the device. Fig. 4 is a side elevation partly in section on the line 4—4 of Fig. 1. Fig. 5 is a top view partly in section, illustrating the valve in open position and with the cover plate removed. Like numerals of reference are employed to designate like parts in all the views.

While my improved cut-off is adapted for general use, I have shown it as applied to a fluid-conducting pipe, such as is employed in sugar refineries, for conducting the syrup from one point to another in the refinery. The cut-off is adapted to be connected in a pipe and to accomplish this purpose, the device is constructed upon a short coupling, or section 1 of the same size as the pipe in which it is to be connected. This section is ordinarily of sheet metal construction and of sufficient length to furnish attachment for my device.

The interior face of the sheet metal section is formed with a downwardly tapered member 2, the lower face of which is spaced away from the wall of the housing, providing beneath the same a channel or groove 3, in which I may, if desired, place a strip of packing 4. The lower end of the skirt 2 is preferably inclined relative to the central axis of the housing 1. This inclination is more clearly indicated in Fig. 4 of the drawing.

The valve or cut-off plate comprises an approximately circular disc of metal 5, the shape of which may be seen in Fig. 5. It has on one side an off-set lug 6, which has an opening therein to receive the down-turned end 7 of the handle member 8. This downturned end is secured rigidly to the valve plate 5 to form a pivot member which, when in position, fits between two spaced fingers 9 upon the side of the housing 1, as shown in Fig. 5. On the side opposite the lug 6 the valve is cut away slightly to form a shoulder 10, which, when the valve is closed, is adapted to engage with a shoulder 11 upon the side of the housing.

The cut-off plate 5, when in open position, is swung outwardly away from the pipe and into a lateral casing 13 projecting from the side of the housing. The lower floor of the casing is inclined, as shown at 13, and is secured by solder or welding to the side of the housing 1, and an opening 14 in the side of said housing allows the passage of fluid from the casing back into the pipe in an obvious manner. The upper surface of the casing 13 is inclined to correspond with the position of the valve plate. The casing 13 has an upwardly directed flange 15 thereon, forming a seat 16 within said flange to support the outer edge of a cover plate 17, which closes the upper end of the casing and is shaped to fit about the side of the housing 1 on its inner side. Said cover plate is held in position by cap screws 18. An opening 19 is formed within the cover plate to provide for access to the interior of the casing, when desired. This opening is normally closed by a plate 20, which is pivoted at 12 and adapted to be rotated on said pivot to expose the opening when the occasion requires. The cover plate 17 has a recess 21 on its inner edge to receive the down-turned end 7 of the valve handle. It will be noted that when the cover plate is inserted in position, the said handle will be supported on its inner side by the lower lugs 9 of the housing, and on its outer side by the outer wall of the recess 21 in the cover plate. This makes it possible to remove the valve plate whenever it becomes necessary to repair or inspect the same during its use.

In operation, this valve in closed position fits tightly against the lower inclined wall of the skirt 2 in the housing. On the lower side of said skirt, the packing ring 4 may provide a fluid-tight closure, when desired. Ordinarily it will only be necessary to fit the packing strip 4 beneath the skirt on the side of the housing away from the casing 13 for the reason that the valve plate will scrape tightly against the lower inclined edge of the skirt at all points, except on the side indicated at 22 in Fig. 5. This side will be brought into engagement with the side of the housing and the packing ring will tend to make the closure fluid-tight at that point. When the valve is thrown into open position, the fluid upon the valve plate will be wiped free from the plate as it is moved outwardly along the lower rim of the skirt 2 and very little fluid will remain upon the valve. Such leakage as does drop from the valve will fall upon the lower wall of the casing 13 and run inwardly through the opening 14 to the housing. There will, therefore, be no leakage and the opening through the housing 1 will be free and unobstructed. The valve is adapted for use in pipes either vertical, inclined, or horizontal, and when used in a horizontal position, the casing 13 for the valve plate will be placed uppermost upon the pipe. It will be obvious, therefore, that I have provided a cut-off which is adapted to close the opening through the conducting pipe so as to make a fluid-tight closure, and when the said cut-off is in open position, it will allow an open unobstructed passage through the pipe but providing against the leakage of fluid from the valve when in open position.

The further objects and advantages will be obvious to those skilled in the art. What I claim as new and desire to protect by Letters Patent is:

1. A cut-off valve for pipes including a tubular housing for connection in a pipe, an inwardly tapered skirt in said housing forming a seat, a valve plate pivoted to swing in contact with said seat to close or open a passage through said housing, and a casing to receive said valve plate when in open position, said casing having a drain opening into said housing.

2. A cut-off valve for pipes including a tubular housing for connection in a pipe, a valve seat in said housing, said seat being inclined relative to the axis of said housing, a valve plate pivoted at one side and adapted to swing to and from said seat, and a casing at one side of said housing to receive said valve plate when said valve plate is in open position, said casing having a drain opening into said housing.

3. A cut-off valve for pipes including a tubular housing adapted for connection in a pipe, an inwardly tapered skirt in said housing, said skirt being inclined along its lower edge to form a seat, a valve plate pivoted at one side of said housing to move into open or closed position, a lateral casing to receive said valve plate when said valve plate is in open position, means to drain said casing, and means to swing said valve plate.

4. A cut-off valve for pipes including a tubular housing adapted for connection in a pipe, a valve plate shaped to close the passage through said housing, means to swing said plate to or from its closed position, means to scrape material from said plate, a casing for said valve plate, a downwardly inclined lower wall to said casing, there being a drainage opening in said housing above said wall, and a removable cover for said casing.

In testimony whereof I hereunto affix my signature this 19th day of March, A. D. 1926.

CLAUDE RIVERS RENEHAN.